United States Patent [19]

Cahill

[11] Patent Number: 5,678,221
[45] Date of Patent: Oct. 14, 1997

[54] APPARATUS AND METHOD FOR SUBSTANTIALLY ELIMINATING NOISE IN AN AUDIBLE OUTPUT SIGNAL

[75] Inventor: Stephen V. Cahill, Palatine, Ill.

[73] Assignee: Motorola, Inc., Schaumburg, Ill.

[21] Appl. No.: 370,341

[22] Filed: Jan. 9, 1995

Related U.S. Application Data

[63] Continuation of Ser. No. 55,899, May 4, 1993, abandoned.
[51] Int. Cl.$^6$ .................................................... H04B 1/10
[52] U.S. Cl. ........................ 455/312; 455/200.1; 395/2.24
[58] Field of Search ................................... 455/309, 312, 455/186.1, 200.1, 212, 221, 225, 234.1; 381/38, 46, 49, 94, 110, 35, 36, 40, 45; 395/2.2, 2.22, 2.24, 2.23, 2.16, 2.17

[56] References Cited

U.S. PATENT DOCUMENTS

| 5,054,078 | 10/1991 | Schorman et al. | 381/94 |
| 5,140,704 | 8/1992 | Ueno | 455/234.1 |

FOREIGN PATENT DOCUMENTS

| 0065627 | 4/1986 | Japan | 455/312 |
| 4046400 | 2/1992 | Japan | 381/38 |

OTHER PUBLICATIONS

Wasem, Ondria J., "The Effect of Waveform Subtitution on the Quality of PCM Packet Communications", Mar. 1988, IEEE Transactions on Acoustics, Speech, and Signal Processing, vol. 36, No. 3, pp. 342-348.

*Primary Examiner*—Reinhard J. Eisenzopf
*Assistant Examiner*—Thanh Le
*Attorney, Agent, or Firm*—Kevin D. Kaschke

[57] ABSTRACT

A method and apparatus, performed by a communication unit (101), for substantially eliminating undesired noise in an audible output signal (113) while a determined quality measure (114) of a received signal (107) is below a predetermined threshold (201). At least a portion the received signal (107) is stored for a predetermined period of time to produce a stored signal (109). A measure of pitch period (111) of the stored signal (109) is determined. When the determined quality measure (114) of the received signal (107) drops below the predetermined threshold (201), a portion of the stored signal (109) is used, responsive to the determined measure of the pitch period (111), to produce the audible output signal (113). To match a boundary between an end of the received signal (107) and an end of the portion of the stored signal (109) a discontinuity between the end of the received signal (107) and the end of the portion of the stored signal (109) at the boundary is determined. Values for a predetermined correction function responsive to the measured discontinuity are determined. The predetermined correction function is applied to the end of the portion of the stored signal (109) to align the end of the portion of the stored signal (109) with the end of the received signal (107) at the boundary. When the determined quality measure (114) of the received signal (107) rises above the predetermined threshold (201), the received signal (107) is used to produce the audible output signal (113).

21 Claims, 3 Drawing Sheets

APPARATUS AND METHOD FOR SUBSTANTIALLY ELIMINATING NOISE IN AN AUDIBLE OUTPUT SIGNAL

This is a continuation of application Ser. No. 08/055,899, filed May 4, 1993 and now abandoned.

FIELD OF THE INVENTION

The present invention relates generally to communication systems and more particularly to an apparatus and method for substantially eliminating noise in an audible output signal.

BACKGROUND OF THE INVENTION

The performance of communications systems is determined substantially by the changing properties of the communications path between a transmitter and a receiver. This path is subject to deterioration from time to time due to signal strength reduction or multiple propagation path effects. Signal strength reduction can be caused by shadowing due to man-made or natural terrain, or due to the cancellation of the received signal by a second received signal with a phase difference caused by the second signal having taken a path of slightly different length. For the case where multiple copies of the signal arrive at the receiver having taken paths of only slightly different lengths, the total received signal comprised of the sum of these slightly delayed signals changes in amplitude as the receiver moves. The amplitude variation is caused by the vector sum of the received signals passing through nulls.

It is also possible for a set of signals to be received which represent copies of the transmitted signal which arrive with substantial differences in the length of path taken. This circumstance produces frequency-selective fading, where only portions of the frequency band containing the received signal have nulls. This condition causes degradation of performance most particularly for applications where the modulation used is digital, in that the frequency selective fading causes the demodulation process to be disturbed.

It is also possible to have interference on the communications link, even though signal strength may be adequate. For example, the AMPS cellular telephone system, which has been in use in the US since 1983, operates with shared frequencies dispersed geographically. If a cellular telephone receives signals from a distant transmitter at a level large relative to the signal which it intends to receive from its local service transmitter, interference occurs. This typically occurs when a clear path is available to the distant transmitter, but the local service transmitter is blocked by terrain obstructions.

All of these reductions in the quality of the communications link result in a reduction in the intelligibility of speech carried over the link. This is manifested in a moving vehicle by noise bursts or audible speech from other cellular telephone conversations. A number of techniques are known in the art to combat these problems.

For example, in the AMPS analog cellular telephone system, the modulation on the received signal includes a supervisory audio tone, or SAT. The SAT tone acts to mitigate interference. It is known in the art that SAT tones be assigned to transmitters in such a way that the most likely interfering transmitters will have a different SAT than the serving transmitter. In the existing art for the AMPS system it is known to mute the received audio when the SAT detector detects that no SAT or an invalid SAT is being received.

It is also known in the art to use received signal strength to mute or otherwise alter the gain of the audible audio signal produced from the received signal. The altered gain reduces the level of the demodulated signal presented to the speaker when it appears that, based on received signal strength, received signal quality is poor.

It is also possible to maintain a measure of the channel impulse response, for example using the known method of measuring the correlation function of known signals embedded in the received signals; when the correlation function shows multiple peaks, the degree to which multiple peaks are present can be compared against a threshold, and used as a mute signal.

In the ADC (American Digital Cellular) or USDC system, the effects of channel deterioration are mitigated by a powerful error correcting code applied to the speech information. Speech in this system is processed in 20 mS intervals, or frames. The transmitter encodes the speech information in digital format with error correcting information. When it is determined by the decoder that the bit error rate, or BER is such that substantial uncorrectable bit errors have occurred in perceptually significant portions of the speech information for a received frame, the previous frame is used instead of the current, corrupted frame. Each succeeding frame for which no valid received information is present results in a re-use of the information from the last valid frame, but at successively reduced levels.

The analog communications systems described suffer from inadequate suppression of the effects of multipath propagation, terrain attenuation, and interference. The current state of the art suffices only to attenuate or mute a corrupted channel, thus removing the irritating effects of noise bursts, but not preserving the intelligibility of the channel. The digital systems known repeat information when the channel is of poor quality, and thus mitigate the more egregious noise bursts, but their repetition is at a fixed at the frame rate of the system. This causes some degradation of the intelligibility of the system.

Therefore, there is a need for an apparatus and method for enhancing the audio output of a communication unit to improve speech intelligibility for a signal received under poor channel conditions.

SUMMARY OF THE INVENTION

Generally, the present invention provides a method and apparatus, performed by a communication unit, for substantially eliminating undesired noise in an audible output signal while a determined quality measure of a received signal is below a predetermined threshold. At least a portion of the received signal is stored for a predetermined period of time to produce a stored signal. A measure of pitch period of the stored signal is determined. When the determined quality measure of the received signal drops below a predetermined threshold, at least a portion of the stored signal is used, responsive to the determined measure of the pitch period, to produce the audible output signal. When the determined quality measure of the received signal rises above the predetermined threshold, the received signal is used to produce the audible output signal.

DETAILED DESCRIPTION OF A PREFERRED EMBODIMENT

Figure 1:
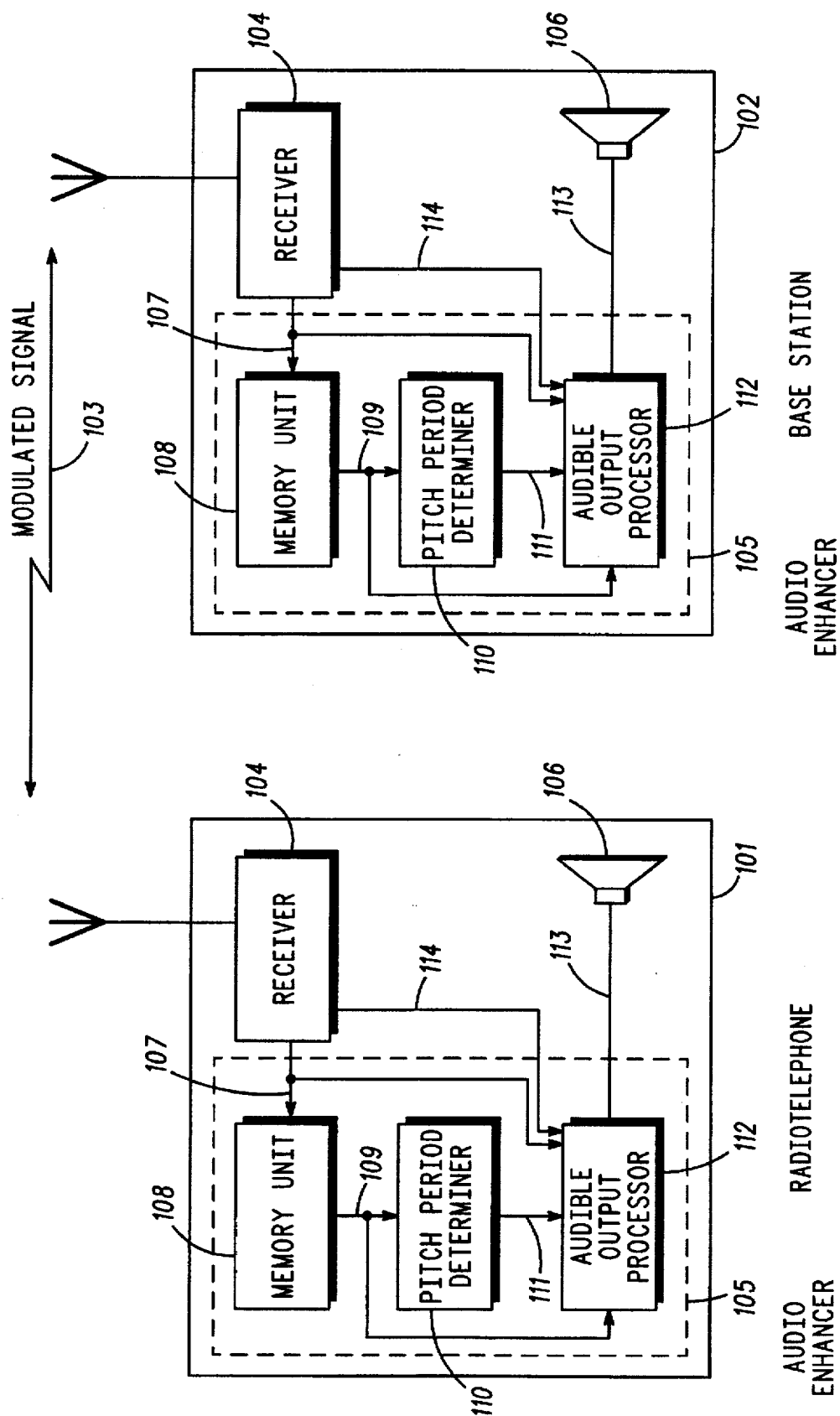
FIG. 1 illustrates a communications system that includes a plurality of communication units in accordance with the present invention.

The present invention can be more fully described with reference to FIGS. 1–3 wherein FIG. 1 illustrates a communications system 100 that includes a plurality of communication units 101 and 102. Each communication unit generally comprises a receiver 104, a memory unit 108, a pitch period determiner 110, an audible output processor 112 and a signal output device 106. FIG. 1 describes a system including communication units, incorporating an audio enhancement process. The audio enhancement process operates such that in a communication unit that receives modulated signals, wherein, from time to time, a quality measure of received modulated signals drops below a predetermined threshold. The communication unit is operable to substantially eliminate undesired noise while the quality measure is below the predetermined threshold.

The communication unit comprises a receiver 104 for receiving a modulated signal 103 to produce a received signal 107. A memory unit 108, operably coupled to the receiver 104 via received signal 107, wherein the memory unit 108 stores at least a portion of the received signal for a predetermined period of time to produce a stored signal 109. A pitch determiner 110, operably coupled to the memory unit 108 via stored signal 109, wherein the pitch determiner 110 determines a measure 111 of the pitch period of stored signal 109. An audible output processor 112, operably coupled to the memory unit 108 via stored signal 109, and to the pitch determiner 110 via determined measure of pitch period 111, and to the receiver 104 via received signal 107 and quality measure 114.

The audible output processor 112 selects at least a portion of the stored signal 109 responsive to the determined measure 111 of the pitch period to produce the audible signal via output 113 for audible signal output device 106 when the quality measure 114 of the received signal drops below the predetermined threshold. The audible output processor 112 selects the received signal 107 to produce the audible output signal 113 when the determined quality measure 114 of the received signal 107 rises above the predetermined threshold 201.

The audio enhancer 105 may be realized by a general purpose programmable DSP (digital signal processor) such as the DSP56156 available from Motorola, which incorporates a CODEC A-D convertor suitable for interface to a radio receiver output, RAM suitable to implement the memory unit 108, and a CODEC D-A suitable to implement a speaker driver producing the audible output signal 113. The DSP, being programmable, is suitable for determining the pitch-period measurement to realize the function of the pitch period determiner 110, suitable for implementing the comparison of the quality measure 114 against the predetermined threshold 201 and suitable for substituting at least a portion of the stored signal 109 for the received signal 107 based on the result of the comparison.

It is also possible to realize the audio enhancer 105 with custom purpose-built logic elements, rather than in a programmable device. An example of the receiver 104 is the receiver section of portable cellular telephone model 9800XL available from Motorola Inc. The receiver section produces a received signal strength indication which is suitable for use as the quality measure 114. The receiver section also produces a demodulated received signal suitable for use as received signal 107. The signal output device 106 is preferably a speaker such as, for example, the one used in the portable cellular telephone model 9800XL. Individually, the receiver 104, the memory unit 108 and signal output device 106 are well known in the art, thus no further discussion will be presented, except to facilitate the understanding of the present invention.

Figure 2:
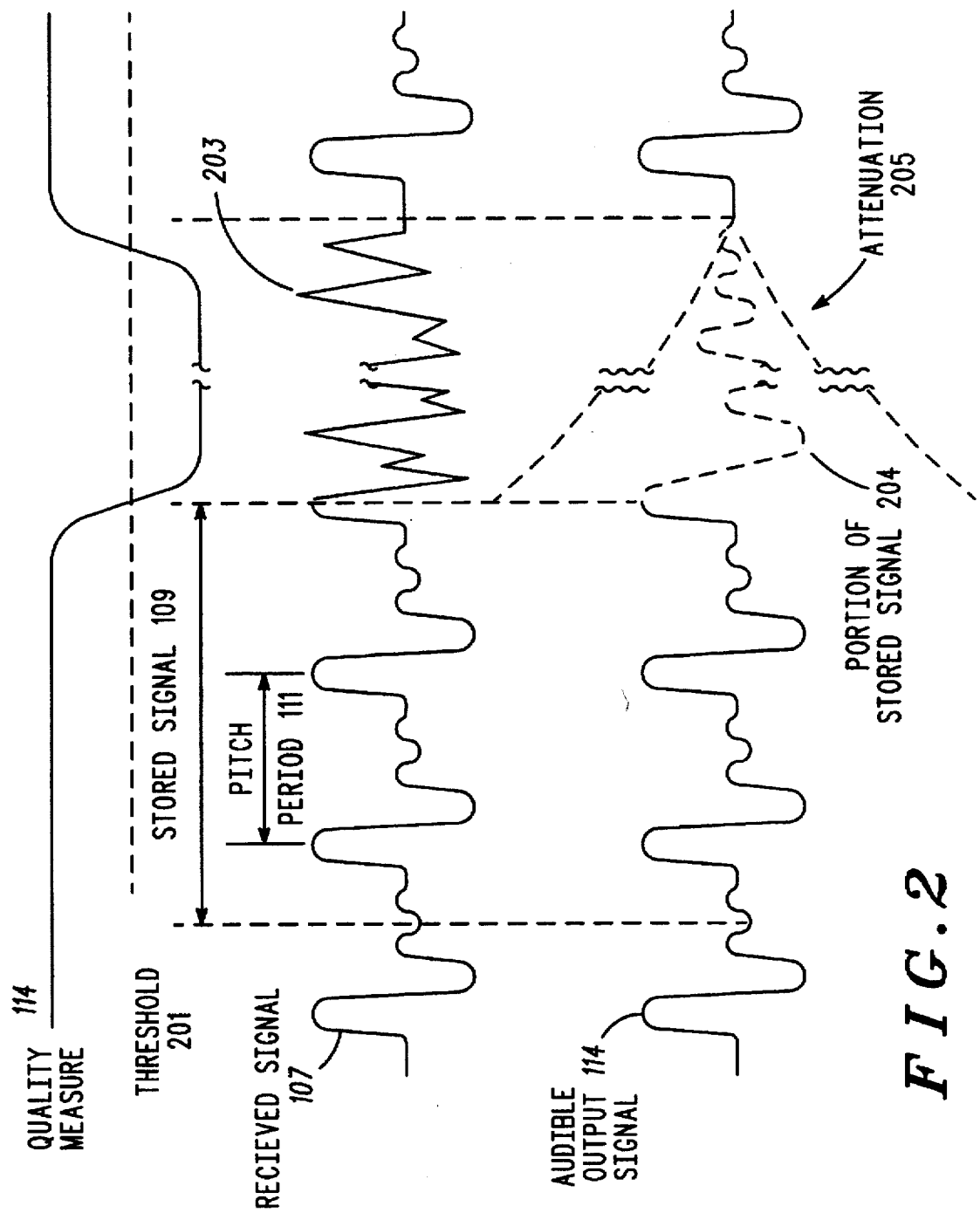
FIG. 2 illustrates signal waveforms that may be produced and utilized by the present invention for use with communication unit of FIG. 1.

FIG. 2 illustrates signal waveforms that may be produced and utilized by the present invention for use with communication unit 101 of FIG. 1. The quality measure 114 is a signal measuring the ability of the received signal 107 to accurately represent the modulation of the modulated signal 103 of FIG. 1. The quality measure 114 is the output of a received signal strength indicator, in the preferred embodiment, but may in other applications be a supervisory audio tone (SAT) correctness indicator, a multipath component amplitude indicator, or a BER (bit error rate) measure. The sense of the quality measure 114 is chosen for the purposes of illustration to be such that the level of the quality measure 114 drops when the quality of the received signal 107 drops.

The threshold 201 is a predetermined threshold against which the quality measure 114 is compared. When the quality measure 114 is better than the threshold 201, the received signal 107 is suitable for use. When the quality measure 114 is worse than the threshold 201, at least a portion of stored signal 109 is used instead. Because the sense of the quality measure 114 can vary depending on the particular measurement technique used, the reference to above or below the threshold as described herein is deemed to mean better or worse than, rather than some absolute sense. For the purposes of illustrating the invention, a positive quality measure 114 is assumed to represent a better received signal 107. Note also that threshold 201 may be adjusted from time to time, on the basis of received signal 107 characteristics, for example the background noise power of the demodulated audio relative to the quality measure. The threshold may also be adjustable based on the state of the quality measure 114, for example a higher threshold may be used when the quality measure 114 is determined to be below the threshold 201, and a lower threshold may be used when the quality measure 114 is above the threshold 201, for the purposes of hysteresis.

Received signal 107 for the purposes of illustration is assumed to be a demodulated speech waveform, having a pitch period 111. The pitch period 111 is the fundamental periodicity of a speech waveform for voiced speech, caused by the periodicity of the vocal cord excitation of the speaker's vocal tract. The measure of the pitch period 111 is an approximation to the correct pitch period, limited by the resolution by which pitch can be measured, or a pseudo-pitch period, which would be used when the received signal has no true pitch period; for example, during unvoiced speech, when the speech excitation is not generated by the vocal cords, but rather by noiselike processes such as the passage of air between the tongue and the teeth, a pseudo-pitch period is used. The measure of pitch period is generated by pitch period determiner 110 by calculating the autocorrelation of the stored signal as a function of time. The non-zero peak of the autocorrelation occurs at a time offset which is the pitch period, to within the resolution of the system. For unvoiced speech, the pitch period chosen would typically be that for which the highest autocorrelation peak occurred within the span of the stored signal 109, even if no true periodicity occurred.

Stored signal 109 is formed by storing at least a portion of the received signal 107 for a predetermined period of time. The stored signal 109 as shown in FIG. 2 represents the portion of the received signal 107 which is retained in memory unit 108 at the time that signal quality measure 114 drops below the threshold 201. The length in time of storage of this stored signal 109 is chosen such that the predetermined period of time comprises at least one pitch period. In the preferred embodiment, it is envisioned that the last 50 mS of received signal 107 received during period when the quality measure 114 is above the threshold 201, would be stored.

A portion of received signal 107 is shown in FIG. 2 interrupted by noise, in section 203. This coincides which the quality measure 114 being below the threshold 201. This illustrates what happens when the received signal is temporarily reduced in amplitude by deterioration of the communications path. The audible output signal 113 has this noise burst excised by replacing the received signal 107 by a portion 204 of the stored signal 109 during the period of the burst, when quality measure 114 is below the threshold 201. This portion 204 commences one pitch period back in time in the stored signal 109, and is repeated in segments up to one pitch period long until quality measure 114 rises above threshold 201.

Attenuation envelope 205 illustrates the reduction in amplitude with time for the portion of the stored signal output as audible signal 113. It is intended that this illustrate the reduction in amplitude during the period of substitution, the characteristics of the attenuation with time being chosen such that for short intervals of quality measure being below the threshold 201, substantially no attenuation of audible output signal 113 occurs, but for long intervals of quality measure being below the threshold 201, audible output signal 114 becomes substantially attenuated. In the preferred embodiment, the attenuation is dB-linear with time, and corresponds to approximately 40 dB per second. This attenuation may also be realized as a unit step function, or other form that implements the attenuation of the substituted signal after the passage of time.

Figure 3:
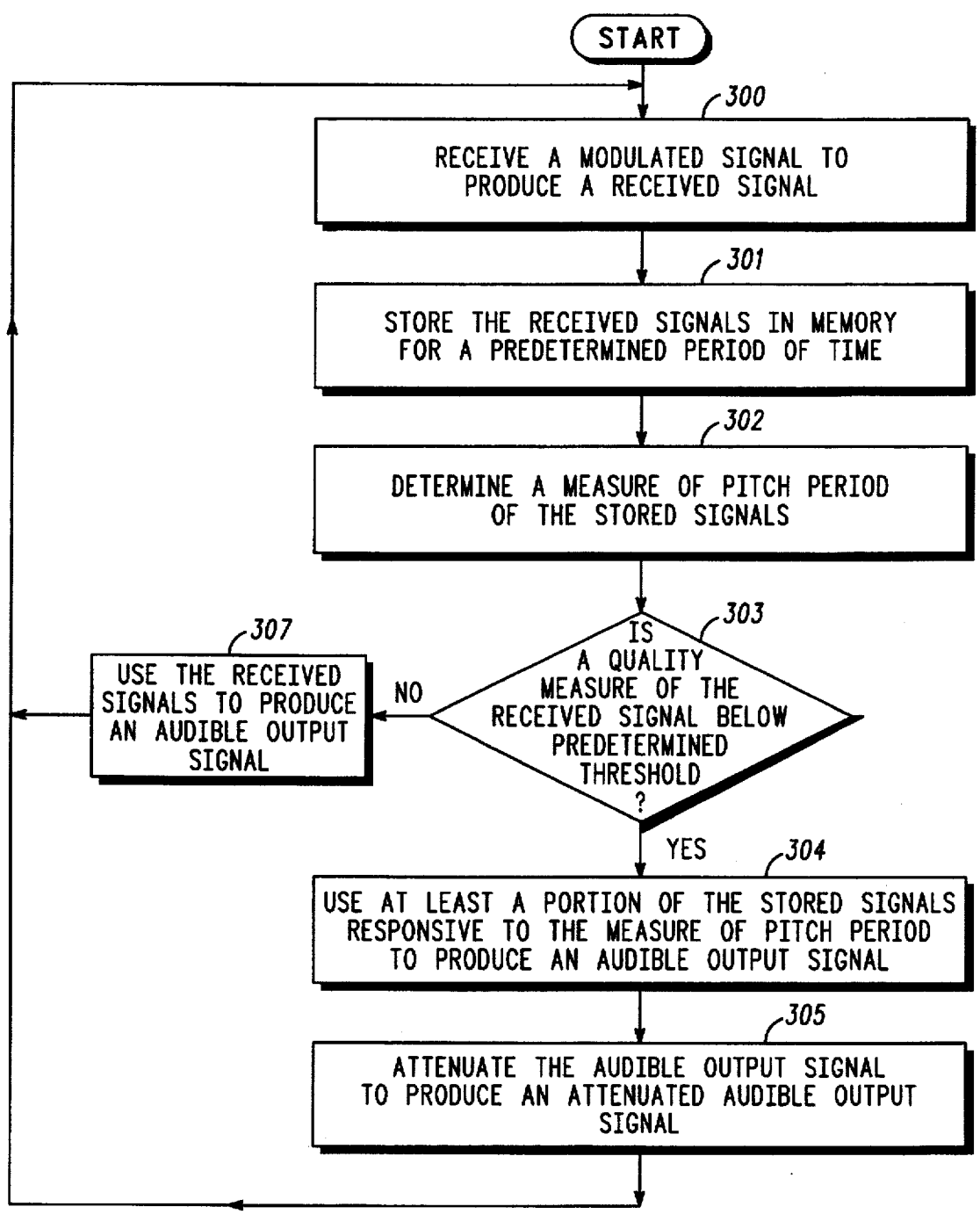
FIG. 3 illustrates a logic diagram used by the communication unit of FIG. 1 in accordance with the present invention.

FIG. 3 illustrates a logic diagram that may be used by the audio enhancer 105 to implement the present invention. At step 300 the receiver 104 receives a modulated signal to produce a received signal 107. The modulated signal 103 in the preferred embodiment is a frequency modulated radio frequency signal. The modulation source of the frequency modulated radio frequency signal is a speech signal. The modulated signal 103 could also be phase modulated or amplitude modulated.

At step 301, the communication unit 101 stores the received signals 107 in memory 108 for a predetermined period of time. In the preferred embodiment, the received signals are digitized and stored in a general-purpose DSP such as DSP 56156, available from Motorola, which implements the audio enhancer 105 of FIG. 1, incorporating the memory unit 108.

At step 302, the communication unit 101 determines a measure of pitch period 111 of the stored signal 109. This is done by calculating the autocorrelation of the stored signal 109. This calculation may be done once when the quality measure drops below the threshold, or it may be done from time to time in such a manner that the determined measure of the pitch period 111 is accurate for the stored signal 109 when the quality measure drops below the threshold.

At stop 303, the communication trait 101 determines if the determined quality measure 114 of the received signal 107 is below the predetermined threshold 201. This is done by comparing the determined quality measure 114 to the predetermined threshold 201. If the determined quality measure 114 is below the predetermined threshold 201, at step 304, use at least a portion of the stored signal, responsive to the determined measure of the pitch period 111, to produce the audible output signal 113. Step 304 is taken if it is determined at stop 303 that the received signal quality is not good enough to use, and that the stored signal should be used instead. The pitch period measure 111 is used to determine the portion 204 of the stored signal 109 to use; how far back in time in the stored signal to start the substituted segment relative to the point where signal quality became unacceptable. Segments of the stored signal up to one pitch period 111 long are repeated at stop 304 to generate the audible output signal 113, so long as the test at stop 303 indicates that the received signal is of insufficient quality.

At stop 305, the communication unit 101 attenuates the audible output signal 113 to produce an attenuated audible output signal. Attenuation reduces the amplitude of the substituted portion of the stored signal 204 as a function of time. Since the stored signal 109 is an approximation to the speaker's current speech, and since that approximation becomes less valid as the stored speech gets older with respect to the current audible output, the substituted speech is attenuated as a function of time, so that the audible output signal 113 is muted after the passage of sufficient time.

Referring back to step 303, if it has been determined that the determined quality measure 114 of the received signal 107 is above the predetermined threshold, use the received signal 107 to produce the audible output 113.

The following discussion provides a practical implementation of the present invention. This invention is rooted in the structure of speech. For voiced speech, a pitch period is present. Thus, for voiced speech, the best possible representation of speech, in the absence of the current speech sample, is given by the speech sample one pitch period previously received in time. In a communications system, a record is maintained of the previously received speech signals, for some reasonable time period, for example 50 mS. When it is determined by one of the known channel quality measurement techniques (received signal strength, channel impulse response, SAT or other interference detection, or by BER as reported by a decoder) that the quality of the channel is inadequate to produce intelligible speech, speech is taken from the stored record, processed to determine the pitch period, and used in pitch-period segments to replace the unintelligible speech otherwise received from the channel.

In more detail, then, the substitution of stored signal for received signal, to produce the audible output, is thus done in conjunction with the pitch period of the received signal. A pitch-period measurement is performed on the stored signal, and, when it is determined by the signal quality measure that the stored signal is to be substituted for the received signal, one pitch-period of the stored data, starting from one pitch-period back in time from where the quality of the received signal became unacceptable, is repeated in place of the received signal to produce the audible output. If the quality of the received signal improves, the substitution of stored signal is terminated, and the received signal is used to produce the audible output. If the quality of the received signal is still unacceptable after one full pitch-period has been repeated, the process is repeated.

Because, with the passage of time, the stored signal becomes a poorer representation of the speech information normally contained in the received signal, the portion of the stored signal substituted for the received signal is attenuated by an increasing amount as time passes. Thus, the audible output is attenuated substantially during long intervals of poor channel quality, but during short poor-received-signal intervals, the substitution of stored signals for received signals renders the effects of received signal quality reduction inaudible, thus increasing speech intelligibility on the link.

During intervals in the speech when unvoiced speech is present, which has no pitch period, being a noise-like signal, a pseudo-pitch can be used, wherein a portion of the speech of arbitrary length is used, the length being chosen based on convenience, the time-variability of the spectral characteristics of speech, and the available storage area.

It is possible to further improve the intelligibility of the audible output by doing end-point correction during the substitution period, whereby the stored received signal, representative of speech, has a correction of the form $y(t)=ax(t)+bt+c$ performed, whereby the values a, b and c are chosen for each segment such that the endpoints of the substituted speech are made to align with the speech present in the received signal at the points where substitution begins and ends. If the stored received signal is not the direct representation of a speech signal, but rather some intermediate stage such as samples at an IF frequency, a corresponding correction can be made in terms of the amplitude and phase of the stored signal. If the stored signal consists of the stored values of the digital modulation encoding a speech waveform, the correction may be made after demodulation.

It is also possible to further improve the intelligibility of the audible output by maintaining a frequency-selective filter on the audible output, the filter being adjusted more or less continuously so as to pass only those portions of the frequency spectrum band where speech is present.

It is also possible to use, for short intervals of poor signal conditions, speech information collected during good signal conditions on both sides in time of the poor signal interval. This requires adding some delay in the production of audible output after being received by the receiver. This additional delay may be acceptable in some systems.

The present invention would find application in communications systems such as a cellular telephone, for example an analog cellular portable telephone model 9800XL, manufactured by Motorola, wherein a radio communications link is maintained between the cellular telephone and a base site or repeater. This invention is applicable to such systems where some measure of received signal quality can be maintained. For example, in Motorola portable cellular telephone model 9800XL, a received signal strength indicator is normally provided. This can be used as the signal quality indicator, being compared against a threshold to determine when the quality of the signal, in this case as determined by its level, is inadequate. The present invention can also be advantageously used in a fixed base station.

The present invention provides an apparatus and method for enhancing the audio output of a communication unit to improve speech intelligibility for a signal received while the quality measure 114 of signals being received is below the predetermined threshold 201. With the present invention the problems of the prior art are substantially resolved. For example, the present invention eliminates audible noise during short intervals of time when the received signal 107 is attenuated by terrain obstructions, and generally improves speech intelligibility.

What is claimed is:

1. In a communication unit that receives modulated signals, wherein a quality measure, determined by the communication unit, of received modulated signals varies relative to a predetermined threshold, a method performed by the communication unit for substantially eliminating undesired noise in an audible output signal while the quality measure is below the predetermined threshold, the method comprises the steps of:

receiving a modulated signal to produce a received signal;

storing at least a portion the received signal for a predetermined period of time to produce a stored signal;

determining a measure of pitch period of the stored signal;

when the determined quality measure of the received signals drops below the predetermined threshold:

utilizing at least a portion of the stored signal, responsive to the determined measure of the pitch period, to produce the audible output signal; and matching an end of the received signal and an end of the portion of the stored signal at a boundary between the end of the received signal and the end of the portion of the stored signal by performing the steps of:

measuring a discontinuity between the end of the received signal and the end of the portion of the stored signal at the boundary;

determining values for a predetermined correction function responsive to the measured discontinuity; and applying the predetermined correction function to the end of the portion of the stored signal to align the end of the portion of the stored signal with the end of the received signal at the boundary; and when the determined quality measure of the received signals rises above the predetermined threshold, utilizing the received signal to produce the audible output signal.

2. A method according to claim 1 wherein the stored signal further comprises the most recent portion of the received signal in time.

3. A method according to claim 1 wherein the predetermined period of time comprises at least one pitch period.

4. A method according to claim 1 further comprising the step of attenuating the audible output signal while the quality measure of the received signal remains below the predetermined threshold to produce an attenuated audible output signal.

5. A method according to claim 1 wherein the portion of the stored signal utilized is repeated while the quality measure of the received signal remains below the predetermined threshold.

6. In a communication unit that receives modulated signals, wherein a quality measure, determined by the communication unit, of received modulated signals varies relative to a predetermined threshold, a method performed by the communication unit for substantially eliminating undesired noise in an audible output signal while the signal strength is below the predetermined threshold, the method comprises the steps of:

receiving a modulated signal to produce received signal;

storing at least a portion of the received signal for a predetermined period of time to produce a stored signal;

when the determined quality measure of the received signal drops below the predetermined threshold, determining a measure of pitch period of the stored signal;

while the determined quality measure of the received signal remains below the predetermined threshold:

utilizing at least a portion of the stored signal, responsive to the determined measure of the pitch period, to produce the audible output signal; and matching an end of the received signal and an end of the portion of the stored signal at a boundary between the end of the received signal and the end of the portion of the stored signal by performing the steps of:

measuring a discontinuity between the end of the received signal and the end of the portion of the stored signal at the boundary;

determining values for a predetermined correction function responsive to the measured discontinuity; and applying the predetermined correction function to the end of the portion of the stored signal to align the end of the portion of the stored signal with the end of the received signal at the boundary; and when the quality measure of the received signals rises above the predetermined threshold, utilizing the received signal to produce the audible output signal.

7. A method according to claim 6 wherein the stored signal further comprises the most recent portion of the received signal in time.

8. A method according to claim 6 wherein the predetermined period of time comprises at least one pitch period.

9. A method according to claim 6 further comprising the step of attenuating the audible output signal while the quality measure of the received signal remains below the predetermined threshold to produce an attenuated audible output signal.

10. A method according to claim 6 wherein the portion of the stored signal utilized is repeated while the quality measure of the received signal remains below the predetermined threshold.

11. In a communication unit that receives modulated signals, wherein a quality measure, determined by the communication unit, of received modulated signals varies relative to a predetermined threshold, a method performed by the communication unit for substantially eliminating undesired noise in an audible output signal while the quality measure is below the predetermined threshold, the method comprises the steps of:

demodulating a received modulated signal to produce an audio signal;

storing at least a portion of the audio signal for a predetermined period of time to produce a stored signal;

when the determined quality measure of the received signal drops below the predetermined threshold, determining a measure of pitch period of the stored signal;

while the determined quality measure of the received signal remains below the predetermined threshold:

utilizing at least a portion of the stored signal, responsive to the determined measure of the pitch period, to produce the audible output signal; and matching an end of the received signal and an end of the portion of the stored signal at a boundary between the end of the received signal and the end of the portion of the stored signal by performing the steps of:

measuring a discontinuity between the end of the received signal and the end of the portion of the stored signal at the boundary;

determining values for a predetermined correction function responsive to the measured discontinuity; and applying the predetermined correction function to the end of the portion of the stored signal to align the end of the portion of the stored signal with the end of the received signal at the boundary; and when the quality measure of the received signal rises above the predetermined threshold, utilizing the audio signal to produce the audible output signal.

12. In a communication unit that receives modulated signals, wherein a quality measure, determined by the communication unit, of received modulated signals varies relative to a predetermined threshold, the communication unit operable to substantially eliminate undesired noise in an audible output signal while the quality measure is below the predetermined threshold, the communication unit comprising:

a receiver for receiving a modulated signal to produce a received signal;

a memory unit, operably coupled to the receiver, wherein the memory unit stores at least a portion the received signal for a predetermined period of time to produce a stored signal;

a pitch determiner, operably coupled to the memory unit, wherein the pitch determiner determines a measure of pitch period of the stored signal; and an audible output processor, operably coupled to the memory unit, the pitch determiner and the receiver;

wherein, when the determined quality measure of the received signal drops below the predetermined threshold, the audible output processor performs the steps of:

utilizing at least a portion of the stored signal, responsive to the determined measure of the pitch period, to produce the audible output signal; and matching an end of the received signal and an end of the portion of the stored signal at a boundary between the end of the received signal and the end of the portion of the stored signal by performing the steps of:

measuring a discontinuity between the end of the received signal and the end of the portion of the stored signal at the boundary;

determining values for a predetermined correction function responsive to the measured discontinuity; and applying the predetermined correction function to the end of the portion of the stored signal to align the end of the portion of the stored signal with the end of the received signal at the boundary; and wherein, when the quality measure of the received signal rises above the predetermined threshold, the audible output processor utilizes the audio signal to produce the audible output signal.

13. A communication unit according to claim 12 wherein the stored signal further comprises the most recent portion of the received signal in time.

14. A communication unit according to claim 12 wherein the predetermined period of time comprises at least one pitch period.

15. A communication unit according to claim 12 further comprising an attenuator for attenuating the audible output signal while the quality measure of the received signal remains below the predetermined threshold to produce an attenuated audible output signal.

16. A communication unit according to claim 12 wherein the portion of the stored signal utilized is repeated while the quality measure of the received signal remains below the predetermined threshold.

17. An apparatus for use with a communication unit operable to receive signals, wherein a quality measure, determined by the communication unit, of received signals varies relative to a predetermined threshold, the apparatus operable to substantially eliminate undesired noise in an audible output signal while the quality measure is below the predetermined threshold, the apparatus comprising:

a memory unit for storing at least a portion of a received signal for a predetermined period of time to produce a stored signal;

a pitch determiner, operably coupled to the memory, wherein the pitch determiner determines a measure of pitch period of the stored signal; and an audible output processor, operably coupled to the memory unit, the pitch determiner and the communication unit;

wherein, when the determined quality measure of the received signal drops below the predetermined threshold, the audible output processor performs the steps of:

utilizing at least a portion of the stored signal, responsive to the determined measure of the pitch period, to produce the audible output signal; and matching an end of the received signal and an end of the portion of the stored signal at a boundary between the end of the received signal and the end of the portion of the stored signal by performing the steps of:

measuring a discontinuity between the end of the received signal and the end of the portion of the stored signal at the boundary;

determining values for a predetermined correction function responsive to the measured discontinuity; and applying the predetermined correction function to the end of the portion of the stored signal to align the end of the portion of the stored signal with the end of the received signal at the boundary; and wherein, when the quality measure of the received signal rises above the predetermined threshold, the audible output processor utilizes the audio signal to produce the audible output signal.

18. An apparatus according to claim 17 wherein the stored signal further comprises the most recent portion of the received signal in time.

19. An apparatus according to claim 17 wherein the predetermined period of time comprises at least one pitch period.

20. An apparatus according to claim 17 further comprising an attenuator for attenuating the audible output signal while the quality measure of the received signal remains below the predetermined threshold to produce an attenuated audible output signal.

21. An apparatus according to claim 17 wherein the portion of the stored signal utilized is repeated while the quality measure of the received signal remains below the predetermined threshold.

\* \* \* \* \*